United States Patent [19]

Van Order et al.

[11] Patent Number: 4,998,765
[45] Date of Patent: Mar. 12, 1991

[54] SLIDING VISOR

[75] Inventors: Kim L. Van Order, Hamilton; Kevin L. Wright; Nels R. Smith, both of Holland, all of Mich.

[73] Assignee: Prince Corporation, Holland, Mich.

[21] Appl. No.: 313,536

[22] Filed: Feb. 21, 1989

[51] Int. Cl.$^5$ .............................................. B60J 3/02
[52] U.S. Cl. ............................ 296/97.11; 296/97.1; 296/97.12
[58] Field of Search ............ 296/97.1, 97.5, 97.8, 296/97.9, 97.11, 97.12

[56] References Cited

U.S. PATENT DOCUMENTS

| 2,207,668 | 7/1940 | Hudgings, Jr. | 296/97.12 |
|---|---|---|---|
| 2,260,482 | 10/1941 | Roberts | 296/97.11 |
| 2,294,317 | 8/1942 | Pelcher | 296/97.11 |
| 2,322,898 | 6/1943 | Dresser | 296/97.11 |
| 2,921,813 | 1/1960 | Lowry | 296/97.6 |
| 3,032,371 | 5/1962 | Berridge et al. | 296/97.11 |
| 3,405,969 | 10/1968 | Creel | 296/97.1 |
| 3,556,585 | 1/1971 | Binder | 296/97.12 |
| 3,865,428 | 2/1975 | Chester | 296/97.11 X |
| 4,000,404 | 12/1976 | Marcus | 296/97.5 X |
| 4,075,468 | 2/1978 | Marcus | 296/97.5 X |
| 4,458,938 | 7/1984 | Viertel et al. | 296/97.1 |
| 4,500,131 | 2/1985 | Fleming | 248/293 X |
| 4,521,046 | 6/1985 | Foggini | 296/97.12 |
| 4,681,363 | 7/1987 | Hemmeke et al. | 296/97.11 |
| 4,762,359 | 8/1988 | Boerema | 296/97.11 |
| 4,828,313 | 5/1989 | Lanser | 296/97.1 |

FOREIGN PATENT DOCUMENTS

| 3235997 | 3/1984 | Fed. Rep. of Germany |  |
| 0499444 | 1/1939 | United Kingdom | 296/97.11 |
| 2088299 | 6/1982 | United Kingdom | 296/97.11 |

Primary Examiner—Dennis H. Pedder
Attorney, Agent, or Firm—Price Heneveld Cooper DeWitt & Litton

[57] ABSTRACT

A sliding visor includes in one embodiment a support member over which a thin butterfly core is folded and secured by a guide for slidable movement along the support member. In one embodiment, the support member has an elongated cross-sectional profile. In another embodiment, a U-shaped guide clamps a planar visor panel therein and in turn slidably extends within a slotted support member for movement along the support member.

3 Claims, 3 Drawing Sheets

U.S. Patent  Mar. 12, 1991  Sheet 1 of 3  4,998,765
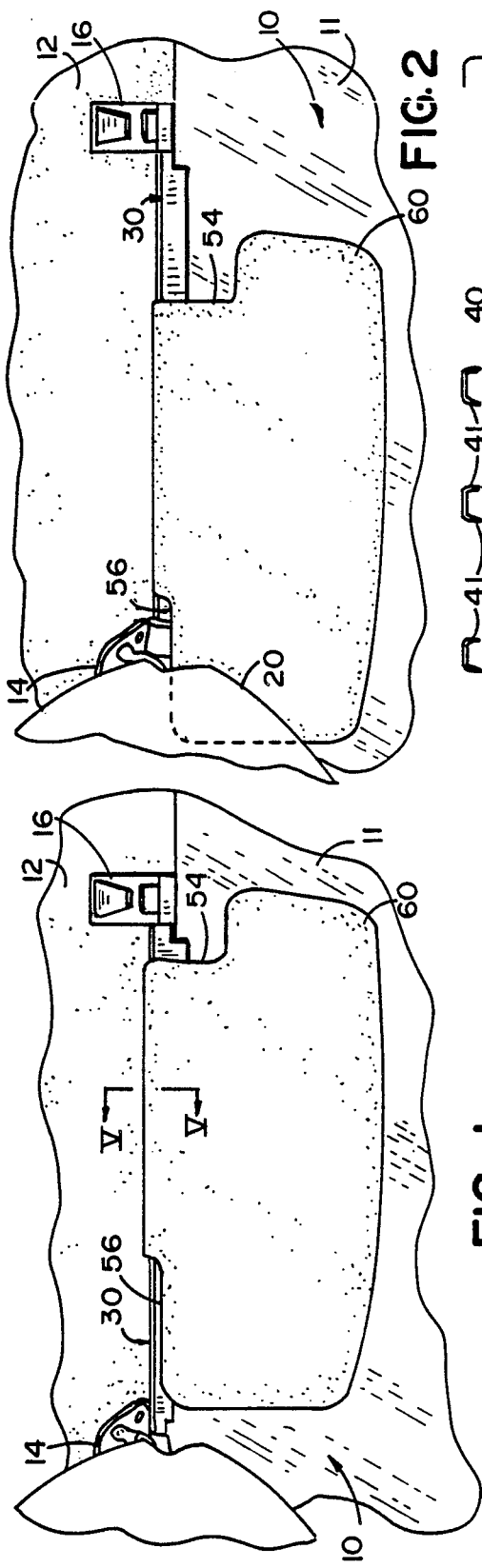
FIG. 1
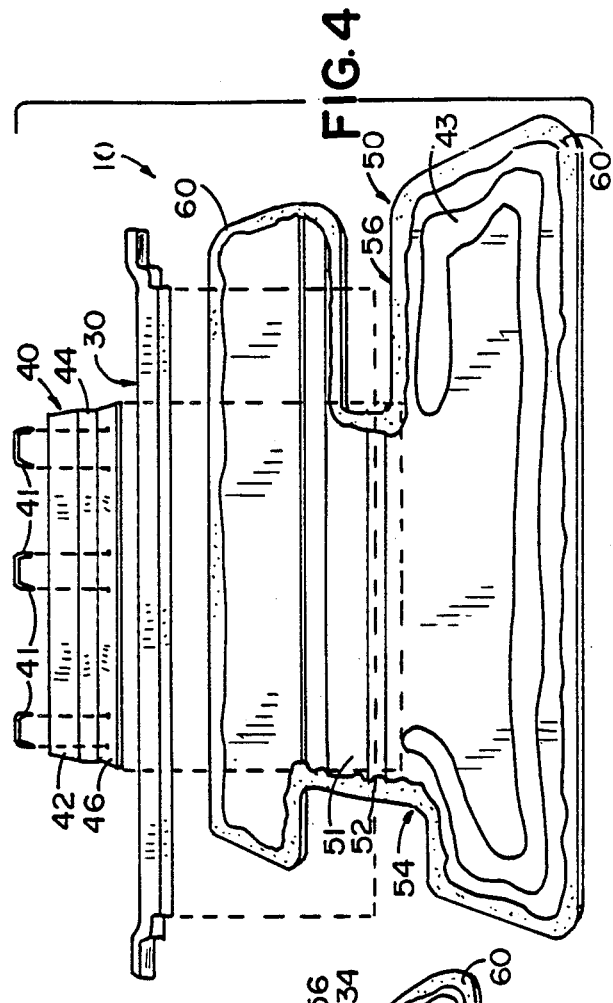
FIG. 2
FIG. 4
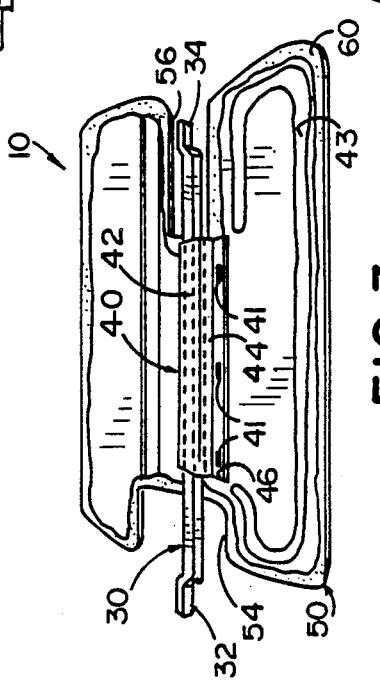
FIG. 3

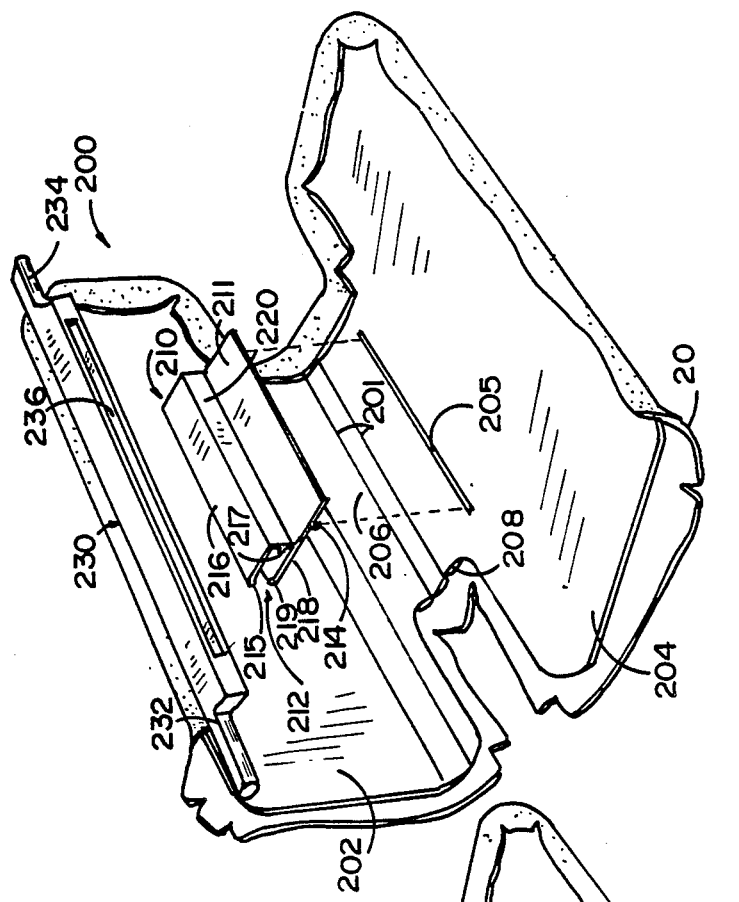
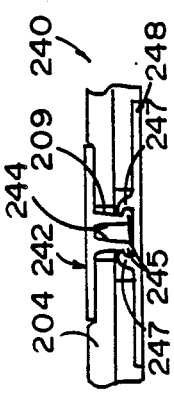
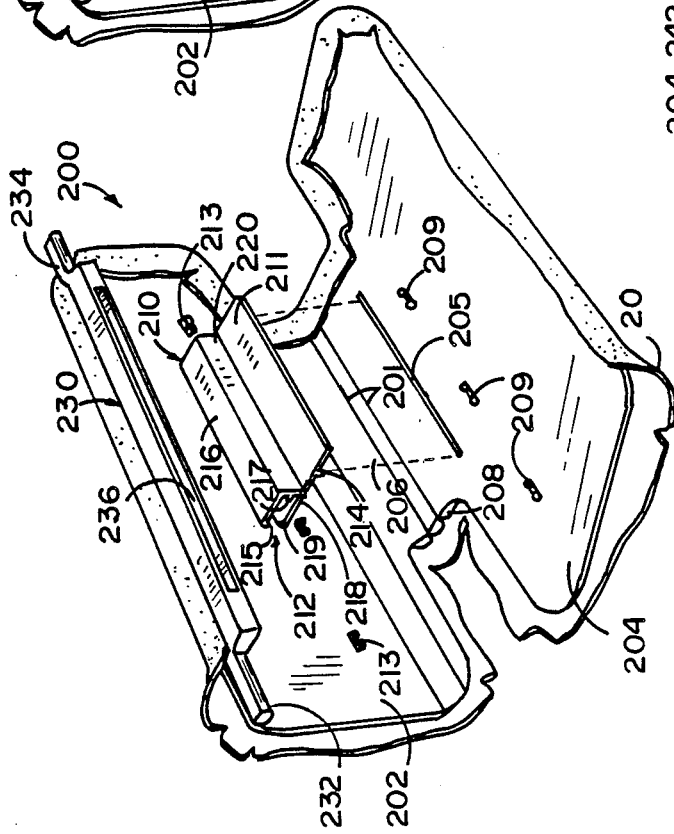
FIG. 9
FIG. 8
FIG. 7

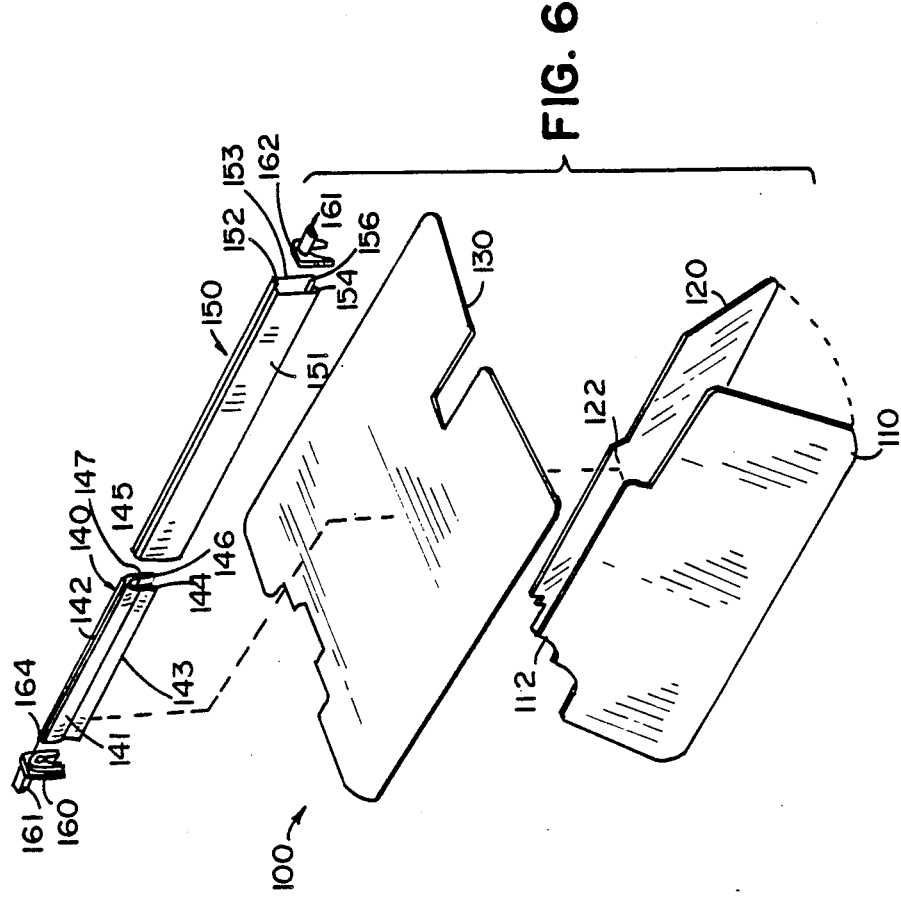
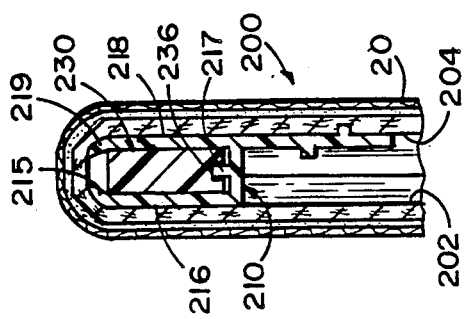
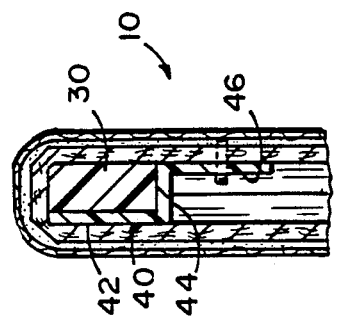

SLIDING VISOR

BACKGROUND OF THE INVENTION

The present invention pertains to a visor and particularly to a sliding visor construction In multiple visor installations of the type, for example, disclosed in U.S. Pat. No. 4,762,359, it is desirable to provide at least one visor which can slide along a support member to provide effective sunblocking protection. In the above-identified patent, the sliding visor is made of a polymeric material including integral mounting bosses surrounding a solid pivot rod. Other sliding visor constructions have also been suggested as, for example, in U.S. Pat. Nos. 3,865,428 and 4,521,046. U.S. patent application Ser. No. 138,368 entitled ADJUSTABLE VISOR and filed on Dec. 28, 1987, also discloses a sliding visor construction with a built-in torque control device.

SUMMARY OF THE PRESENT INVENTION

The sliding visor construction of the present invention provides an alternative to the construction disclosed in the prior art by providing a visor core construction surrounding a slide mechanism which results in a relatively lightweight and inexpensive visor construction which provides a finished upholstered visor appearance to match the primary visor when the auxiliary visor is employed as part of a multiple visor system. Visors embodying the present invention include a visor support rod having a cross section with an overall thickness dimension substantially different than its height dimension, a guide member cooperatively and slidably engages the support rod and is secured to a visor core. In one embodiment, the visor core is butterfly-shaped comprising a pair of substantially symmetrical panels which surround the support rod and guide member which is secured to the core. In another embodiment, the rod comprises a hollow, elongated member having a slot extending along one edge for receiving the guide member which compressively secures the visor core therein. Another embodiment provides a guide member which at least partially surrounds the support rod. With such construction, a relatively inexpensive and yet attractive sliding visor construction is provided which is durable and provides smooth sliding action and is relatively lightweight These and other features, objects and advantages of the present invention will become apparent upon reading the following description thereof together with reference to the accompanying drawings in which:

BRIEF DESCRIPTION OF THE DRAWINGS

FIG. 1 is a perspective view of a visor embodying the present invention shown in a first use position;

FIG. 2 is a perspective view of a visor embodying the present invention shown in a second use position:

FIG. 3 is a reduced sized perspective view of the visor of the present invention shown partially unassembled;

FIG. 4 is an enlarged perspective exploded view of the visor of the present invention;

FIG. 5 is an enlarged, fragmentary cross-sectional view taken along section lines V—V of FIG. 2;

FIG. 6 is a perspective, exploded view of an alternative embodiment of the present invention;

FIG. 7 is an exploded, perspective view of yet another embodiment of the present invention;

FIG. 8 is an enlarged, fragmentary cross-sectional view of the interlocking mechanism used in connection with the visor shown in FIG. 7;

FIG. 9 is a perspective, exploded view of yet another embodiment of the present invention; and FIG. 10 is an enlarged fragmentary vertical cross-sectional view of the visor rod and guide employed in the embodiments of FIGS. 7 and 9.

DETAILED DESCRIPTION OF THE PREFERRED EMBODIMENT

Referring initially to the visor shown in FIGS. 1-5, there is shown a visor 10 which is mounted above the windshield 11 of a vehicle having a roof 12 for receiving a first mounting bracket 14 and a second mounting bracket 16. Brackets 14 and 16 accommodate the first visor 10 and a second visor 20 which can pivot about bracket 14 between a front window position or a side window position as illustrated in FIGS. 1 and 2. Brackets 14 and 16 are of the type described in greater detail in U.S. Pat. No. 4,690,450, the disclosure which is incorporated herein by reference.

Visor 10 also is mounted between brackets 14 and 16 and for such purpose an elongated visor support or rod 30 is employed which is made of a polymeric material such as polycarbonate and has a generally rectangular cross-sectional area having a thickness significantly less than its height as best seen in FIG. 5. Support 30 has integral narrowed and generally rounded ends 32 and 34 which fit within the sockets formed in brackets 14 and 16 to provide a predetermined rotational torque of the rod 30 with respect to the brackets 14 and 16 for movement between a lowered use position as illustrated in FIGS. 1 and 2 to an upwardly pivoted stored position against roof 12. In the multiple visor installation shown in FIGS. 1 and 2, visor 10 is raised to such a stored position prior to movement of visor 20 to a stored position with visor 10 being sandwiched between the roof 12 and visor 20.

Visor 10 also includes a guide member 40 which, in the preferred embodiment and as best seen in FIG. 5, has a pair of offset generally parallel legs with a first leg 42 at the top, an intermediate leg 44 extending orthogonal to leg 42, and a lower mounting leg 46 extending downwardly from the horizontal extending intermediate leg 44, all of which are integrally formed and extend along a substantial portion of the length of support 30 as best seen in FIGS. 3 and 4.

Visor 10 also includes a core member 50 which is shown in a butterflied, open position in FIGS. 3 and 4 and is made of a relatively thin, fiberboard material having a symmetric configuration about a centerline fold 52 and which includes a U-shaped notch 54 at one end and an elongated second U-shaped notch 56 at an opposite end. Guide member 40 is stapled by staples 41 at least at three locations as seen in FIGS. 3-5 and for securing the guide member 40 to core 50 in a position adjacent fold line 52 such that legs 42 and 44 partially circumscribe support or rod 30 for supporting the visor 10 thereon in slidable engagement therewith. The center area 51 of the visor core 50 may include a film of lubricous polymeric material such as polyethylene covering the fiberboard to provide a lubricous wear resistant surface for a smoother sliding interface between support 30 and the inner surface of visor core 50.

Core 50 is upholstered by a suitable upholstery material 60 having an integral foam backing 62 and a cloth exterior bonded thereto. The fabric 60 is adhesively secured to core 50 and wrapped around the edges of the butterfly core 50 as seen in FIGS. 3 and 4 after guide member 40 is attached adjacent and parallel to fold line 52. Rod or support 30 is then placed in the open notch formed by legs 42 and 44 of the guide 40 and the visor core halves folded together and bonded by a suitable bonding material such as an adhesive such as a hot melt glue 43 (FIGS. 3 and 4). The rounded ends 32 and 34 of support 30 are then inserted into brackets 14 and 16 to which visor 20 is also attached prior to installation of the visor assembly to the vehicle.

The relatively enlarged, rectangular cross section of the support 30 allows a relatively thin fiberboard material to be employed for the butterfly core construction, and therefore, provides a relatively thin visor blade 10 which is suitable as shown in the embodiment of FIGS. 1 and 2 as an auxiliary visor. The upholstery 60 provides an appearance matching that of visor 20 which is upholstered by the same material. By virtue of the use of polymeric material both for the rod 30 and the guide member 42 and an optional inner layer of film 51, smooth sliding action is provided for movement of visor 10 to the left side as illustrated in FIG. 2 adjacent visor 20 and the A-pillar of the vehicle, or to the right as shown in FIG. 1 toward the centerline of the vehicle.

In the embodiment shown in FIG. 6, a visor 100 is shown which includes a pair of core panels 110 and 120 which are generally separate rectangular panels having upwardly projecting rectangular flanges 112 and 122 respective over which there is fitted an upholstery covering 130 with the combination being tucked in a resilient polymeric generally inverted U-shaped clamping member 140 slidably mounted within a support member defining a sleeve 150 capped at either end by end fittings 160 and 162. The visor 100 is installed within brackets 14 and 16 in the same manner as visor 10 once assembled. The lengths of the flanges 112 and 122 and clamp 140 are substantially less than the length of sleeve 150 thereby allowing for sliding movement of the visor 100 along the sleeve 150. Clamp 140 includes a top ridge 142 extending upwardly and longitudinally along the clamp and which is nestably received in an outwardly extending longitudinal recess 152 in sleeve 150. Sleeve 150 is preferably extruded of a polymeric material such as polycarbonate while the resilient and lubricous polymeric clamp 140 can be made of polypropylene. Clamp 140 includes a rounded semi-cylindrical top 141 with downwardly depending legs 143 and 145 having a length substantially equivalent to the height of the sides 151 and 153 of sleeve 150. The ends 144 and 146 of legs 143 and 145 respectively, are narrowed to fit within the notches defined by the upturned ends 154 and 156 of legs 151 and 153 respectively, of the sleeve for captively holding the clamp within the sleeve.

The width of the slot 147 is thereby enlarged at the tip end by the narrowed leg sections 144 and 146 to more readily receive the core members 112 and 122 which are upholstered by upholstery 130 in the manner described above in connection with visor 10 for initial insertion of the visor panel into the clamp which are then snugly held in the narrowed slot section 147. The clamp, with the upholstered visor panels 110 and 120 mounted thereto, is slid into one end of the sleeve 150 and end caps 160 and 162 are snap fitted in the ends. As seen with respect to end cap 160, each of the end caps includes a stub axle 161 which fits within a respective mounting bracket 14 or 16 of the visor installation as illustrated in FIGS. 1 and 2 and an inwardly projecting section 164 which extends sufficiently within the sleeve for holding end caps 160 and 162 in position as the visor 100 is rotated between raised stored positions and lowered use positions. The length of the sleeve 150 is such that it extends substantially between brackets 14 and 16 of the visor installation while allowing visor 100 to be adjusted between the same positions shown in FIGS. 1 and 2.

Yet another embodiment of the invention is illustrated in FIGS. 7-10, in which a visor 200 includes a core made of folded panels 202 and 204 covered by a suitable upholstery material 207 and finished in the manner set forth in the embodiment of FIGS. 1-5. The core sections 202 and 204 may be made of a folded polymeric material or fiber-board with hinge lines 201 extending between narrowed flange portions 206 and 208 Of the core sections 202 and 204, respectively.

A guide member 210 is secured to core section 204 by a downwardly projecting mounting ridge 214 which extend from flange 211 and fits within a rectangular slot 205 formed in core section 204. This anchors and secures the guide member 210 within the body of the visor defined by core halves 202 and 204 and can be further mounted such as by stapling, adhesive, or other suitable bonding agents.

The guide 210 includes, as best seen in FIG. 10, a U-shaped section 212 with an upper leg 216 with an inwardly projecting tip 215 and a lower leg 218 with an inwardly projecting tip 219. An upwardly extending guide rib 217 extends centrally along the interior floor section 220 of the guide and extends along the length of the floor within the U-shaped channel 212.

The guide member fits over and circumscribes at least a portion of the visor support or beam 230 which includes a generally rectangular cross section with pivot stub axles 232 and 234 at opposite ends thereof. Along the lower edge and extending substantially the entire length of beam 230 is an elongated rectangular slot 236 which receives guide ridge 217. The ends 215 and 219 fit over the top edge of beam 230 to captively hold the beam within the guide with both members being integrally molded of a suitable lubricous polymeric material such as polycarbonate and polypropylene respectively, such that the guide which is securely attached to the visor core slides along the significantly longer beam. The beam is assembled within guide member 210 prior to the final assembly of the visor core halves which can be accomplished by employing conventional adhesive materials or by suitable heat fusion if the core is made of a polymeric material as shown in FIG. 9.

In the embodiment where the core material is relatively thin fiberboard as illustrated in FIG. 7, the core halves may instead be held together utilizing the plurality of staples or snap assemblies 240 as best seen in FIG. 8. Each assembly 240 includes a male portion 242 extending through a plurality of slots 209 in core half 204 and with outwardly and laterally extending legs 244 with outwardly extending flanges 245 at the ends thereof. Legs 244 snap fit within sockets defined by legs 247 on each female portion 248 of each assembly 240 as best seen in FIG. 8. Members 248 are fitted within slots 213 formed in core half 202 with slots 209 lined with slots 213 along the length of the visor at spaced locations sufficient for holding the visor halves 202 and 204 together. The locking members 240 include relatively large planar heads which can be recessed as shown in FIG. 8 and are integrally made of a suitable polymeric material colored to match the color of the upholstery material 207.

In each of the various preferred embodiments, the support member or beam extending between the mounting brackets has a height which is about twice that of its thickness to provide an enlarged surface area (either inner or outer) for the visor guide to engage.

It will become apparent to those skilled in the art that various modifications to the preferred embodiment of the invention can be made without departing from the spirit or scope thereof as defined by the appended claims.

The embodiments of the invention in which an exclusive property or privilege is claimed are defined as follows:

1. A sliding visor for a vehicle comprising:
a support member for attachment above a window of a vehicle and having a generally rectangular cross-section, said visor including a visor core and guide means cooperatively and slidably coupling said visor core to said support member such that said visor can slide along said support member, wherein said guide means comprises a generally U-shaped member having legs which partially circumscribe said support member for slidable movement therealong, and wherein said support member includes an elongated recess extending along one edge thereof an wherein said guide means includes rib means extending into said recess for providing additional stability to the connection of said guide means to said support member.

2. A sliding visor for a vehicle, comprising a support member for attachment above a window of a vehicle and having a generally rectangular cross-section said visor including a visor core and guide means cooperatively and slidably coupling said visor core to said support member such that said visor can slide along said support member, said support member including means for mounting said support member to the roof of a vehicle in a position parallel to and above a vehicle window, and wherein said guide means comprises a generally U-shaped member having legs which partially circumscribe said support member for slidable movement therealong, and wherein said support member includes an elongated recess extending along one edge thereof and wherein said guide means includes a rib extending into said recess for providing additional stability to the connection of said guide means to said support member.

3. A sliding visor for a vehicle, comprising a generally rectangular support member for attachment above a window of a vehicle, said visor including a visor core and guide means cooperatively and slidably coupling said visor core to said support member such that said visor can slide along said support member and wherein said core folds over said guide means and support member which are contained within said visor core, wherein said support member includes an elongated recess extending along one edge thereof and said guide means includes a rib extending into said recess for providing additional stability to the connection of said guide means to said support member.

* * * * *